US011071016B2

(12) United States Patent
Tang

(10) Patent No.: US 11,071,016 B2
(45) Date of Patent: Jul. 20, 2021

(54) PATH SWITCHING METHOD AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/645,984

(22) PCT Filed: Sep. 28, 2017

(86) PCT No.: PCT/CN2017/103997
§ 371 (c)(1),
(2) Date: Mar. 10, 2020

(87) PCT Pub. No.: WO2019/061151
PCT Pub. Date: Apr. 4, 2019

(65) Prior Publication Data
US 2020/0205034 A1 Jun. 25, 2020

(51) Int. Cl.
H04W 28/08 (2009.01)
H04W 76/15 (2018.01)
H04W 80/02 (2009.01)

(52) U.S. Cl.
CPC .......... H04W 28/08 (2013.01); H04W 76/15 (2018.02); *H04W 80/02* (2013.01)

(58) Field of Classification Search
CPC ... H04W 76/15; H04W 72/04; H04W 36/026; H04W 36/0069; H04W 76/22; H04W 28/08
See application file for complete search history.

(56) References Cited

U.S. PATENT DOCUMENTS

2004/0033801 A1* 2/2004 Yi ........................... H04L 69/04
455/428
2014/0133298 A1* 5/2014 Han .................. H04W 28/0289
370/230
(Continued)

FOREIGN PATENT DOCUMENTS

CN 104935414 A 9/2015
CN 106304060 A 1/2017
(Continued)

OTHER PUBLICATIONS

3GPP TR 38.912 V14.1.0 (Jun. 2017)—3rd Generation Partnership Project; Technical Specification Group Radio Access Network; Study on New Radio (NR) access technology (Release 14) (74 pages).

(Continued)

*Primary Examiner* — Syed Ali
(74) *Attorney, Agent, or Firm* — Perkins Coie LLP

(57) ABSTRACT

Provided are a path switching method and a terminal device. The terminal device has a packet data convergence protocol (PDCP) layer, the PDCP layer being able to send uplink data to a first cell group or a second cell group, the first cell group and the second cell group being different cell groups, the PDCP layer currently sending the uplink data to the first cell group; the method comprises: the terminal device enabling the switching of the PDCP layer from sending the uplink data to the first cell group, to sending the uplink data to the second cell group; and the terminal device sending first uplink data to the second cell group, the first uplink data at least including first data, the first data referring to the data that the terminal device has sent to a radio link control protocol (RLC) layer of the first cell group.

12 Claims, 3 Drawing Sheets

(56) References Cited

U.S. PATENT DOCUMENTS

| | | | |
|---|---|---|---|
| 2014/0362829 A1 | 12/2014 | Kazmi et al. | |
| 2015/0173044 A1* | 6/2015 | Rinne | H04W 76/12 370/254 |
| 2015/0215826 A1 | 7/2015 | Yamada | |
| 2015/0223093 A1* | 8/2015 | Zhang | H04L 43/0852 370/252 |
| 2016/0044639 A1 | 2/2016 | Yi et al. | |
| 2018/0324651 A1* | 11/2018 | Tenny | H04W 36/0027 |
| 2019/0007291 A1* | 1/2019 | Yi | H04L 69/22 |
| 2019/0215721 A1* | 7/2019 | Tang | H04W 24/04 |

FOREIGN PATENT DOCUMENTS

| | | |
|---|---|---|
| CN | 106941700 A | 7/2017 |
| WO | 2015067823 A1 | 5/2015 |
| WO | 2016065591 A1 | 5/2016 |

OTHER PUBLICATIONS

3GPP TS 38.300 V1.0.0 (Sep. 2017)—3rd Generation Partnership Project; Technical Specification Group Radio Access Network; NR; NR and NG-RAN Overall Description; Stage 2 (Release 15) (59 pages).

3GPP TSG-RAN2 Meeting #84—San Francisco, USA, Nov. 11~15, 2013—R2-133905—ZTE, User plane issue related to bearer split (4 pages).

Supplementary European Search Report dated Sep. 7, 2020 of European Patent Application No. 17927596.1 (10 pages).

First Office Action of 201780050389.2 dated Nov. 27, 2019 (15 pages).

International Search Report dated Jun. 1, 2018 of PCT/CN2017/103997 (3 pages).

R2-144469 DC L2 Dual connectivity: procedural specification of layer 2 reconfigurations, Samsung (7.1.2.1), 3GPP TSG-RAN2#87bis meeting, Shanghai, P.R. China, Oct. 6-10, 2014 (7 pages).

R2-1707075 Allowing pre-processing on UL split bearer, vivo (10.3.3.4), 3GPP TSG-RAN WG2 NR Ad Hoc, Qingdao, China, Jun. 27-29, 2017 (4 pages).

R2-1707719 PDCP operation for packet duplication, Huawei, ASUSTeK, HiSilicon (10.3.3.5), 3GPP TSG-RAN WG2 #99, Berlin, Germany, Aug. 21-25, 2017 (6 pages).

R2-1708438 Allowed Bearer type changes and L2 handling, Samsung (10.2.2.2), 3GPP TSG-RAN WG2 2017 RAN2#99 Meeting, Berlin, Germany, Aug. 21-25, 2017 (6 pages).

R2-1708686 SDU delivery at PDCP re-establishment for UM bearers, Nokia, Nokia Shanghai Bell (10.3.3.3), 3GPP TSG-RAN WG2 #99, Berlin, Germany, Aug. 21-25, 2017 (2 pages).

R2-1708946 PDCP UL switching, Qualcomm Incorporated, Broadcom, MediaTek Inc., 10.3.3.4, NR_newRAT-Core—Release 15, 3GPP TSG-RAN WG2 Meeting #99, Berlin, Germany, Aug. 21-25, 2017 (4 pages).

IPA, Examination Report No. 1 for Australian Patent Application No. 2017433843. dated Mar. 22, 2021. 4 pages.

IPI, Examination Report for Indian Patent Application No. 202017016520. dated Jun. 3, 2021. 6 pages with English translation.

* cited by examiner

PATH SWITCHING METHOD AND TERMINAL DEVICE

CROSS-REFERENCE TO RELATED APPLICATION

The present application is a U.S. National Phase Entry of International PCT Application No. PCT/CN 2017/103997 filed on Sep. 28, 2017, which is hereby incorporated by reference in its entirety.

TECHNICAL FIELD

Implementations of the present disclosure relate to the communication field, and more particularly, to a path switching method and a terminal device.

BACKGROUND

In Long Term Evolution (LTE), after upper layer data arrive, the upper layer data stays in a Packet Data Convergence Protocol (PDCP) layer, and when an uplink resource grant from a Master Cell Group (MCG) or Secondary Cell Group (SCG) reaches the UE, the UE sends the data down to a Radio Link Control (RLC) layer of the MCG or SCG, and finally the data are sent to a base station end.

However, a disadvantage of the above technical scheme is that the UE will not send data from the PDCP layer to an RLC layer to generate an RLC PDU and then generate a MAC PDU until the uplink resource grant reaches the UE, which requires too high instantaneous processing capability of the UE.

To overcome the disadvantage of the above technical scheme, a pre-processing scheme is provided in New Radio (NR). Specifically, the UE is allowed to send data from the PDCP layer to the RLC layer to generate the RLC PDU before the uplink resource grant reaches the UE, and after the uplink resource grant reaches the UE, a MAC PDU is generated, thus reducing a requirement on the instantaneous processing capability of the UE.

However, the pre-processing scheme also has some negative effects. For example, if a user is at a MCG at beginning and has done a certain amount of data preprocessing, and the data have been sent from the PDCP layer to the RLC layer of the MCG, and then when the user switches to an SCG, the preprocessed data are not "switched", resulting in a decrease in switching performance.

SUMMARY

A path switching method and a terminal device are provided.

In a first aspect, a path switching method is provided. The method is applied to a terminal device which has a packet data convergence protocol (PDCP) layer that is capable of sending uplink data to a first cell group or a second cell group, the first cell group and the second cell group are different cell groups, and the PDCP layer currently sends uplink data to the first cell group; The method includes: the terminal device switches the PDCP layer from sending uplink data to the first cell group to sending uplink data to the second cell group; and the terminal device sends first uplink data to the second cell group, wherein the first uplink data includes at least first data, and the first data refers to data that have been sent to a radio link control protocol (RLC) layer of the first cell group by the terminal device.

In some possible implementations, the first data includes data that have been sent to the RLC layer of the first cell group and for which no correct reception feedback has been received by the terminal device.

In some possible implementations, the first data includes data that have been sent to the RLC layer of the first cell group by the terminal device and not completely mapped to a media access control (MAC) protocol data unit (PDU).

In some possible implementations, before sending, by the terminal device, the first uplink data to the second cell group, the method further includes: the PDCP layer of the terminal device sends first indication information to the RLC layer of the first cell group, and the first indication information is used for indicating the RLC layer of the first cell group to clear the first data.

In some possible implementations, before switching, by the terminal device, the PDCP layer from sending uplink data to the first cell group to sending uplink data to the second cell group, the method further includes: the terminal device receives second indication information sent by a network device, wherein the second indication information is used for indicating the terminal device to switch the PDCP layer from sending uplink data to the first cell group to sending uplink data to the second cell group; wherein switching, by the terminal device, the PDCP layer from sending uplink data to the first cell group to sending uplink data to the second cell group, includes: the terminal device switches the PDCP layer from sending uplink data to the first cell group to sending uplink data to the second cell group according to the second indication information.

In some possible implementations, the first uplink data further includes data that have not been sent to the first cell group in a cache of the PDCP layer before the terminal device switches the PDCP layer from sending uplink data to the first cell group to sending uplink data to the second cell group.

In some possible implementations, the first uplink data further includes data received by the PDCP layer after the terminal device switches the PDCP layer from sending uplink data to the first cell group to sending uplink data to the second cell group.

In a second aspect, a terminal device is provided. The terminal device has a packet data convergence protocol (PDCP) layer that is capable of sending uplink data to a first cell group or a second cell group, wherein the first cell group and the second cell group are different cell groups, and the PDCP layer currently sends uplink data to the first cell group. The terminal device includes: a processing unit, configured to switch the PDCP layer from sending uplink data to the first cell group to sending uplink data to the second cell group; a transceiving unit, configured to send first uplink data to the second cell group, wherein the first uplink data includes at least first data, and the first data refers to data that have been sent to a radio link control protocol RLC layer of the first cell group by the terminal device.

In a third aspect, a terminal device is provided. The terminal device has a packet data convergence protocol (PDCP) layer that is capable of sending uplink data to a first cell group or a second cell group, wherein the first cell group and the second cell group are different cell groups, and the PDCP layer currently sends uplink data to the first cell group. The terminal device includes: a processor, configured to switch the PDCP layer from sending uplink data to the first cell group to sending uplink data to the second cell group; and a transceiver, configured to send first uplink data to the second cell group, wherein the first uplink data includes at least first data, and the first data refers to data that have been sent to a radio link control protocol (RLC) layer of the first cell group by the terminal device.

It should be understood that the terminal devices of the second and third aspects in the implementations of the present disclosure can perform the method implementations in the above-mentioned first aspect and method implementations in various implementations.

In a fourth aspect, a computer readable medium is provided, which is used for storing a computer program. The computer program includes instructions for executing the method implementations of the above first aspect and method embodiments in various implementations.

In a fifth aspect, a computer chip is provided. The computer chip includes an input interface, an output interface, at least one processor, and a memory. The at least one processor is used for executing codes in the memory. When the codes are executed, the processor may implement various processes executed by the terminal device in path switching methods in the first aspect and in various implementations.

In a sixth aspect, a communication system is provided. The communication system includes the above terminal device.

DETAILED DESCRIPTION

It should be understood that technical solutions of implementations of the present disclosure may be applied to various communication systems. For example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), a Universal Mobile Telecommunication System (UMTS), etc.

In addition, various implementations are described in connection with a network device and a terminal device in the present disclosure.

Herein, the network device may refer to any entity at a network side for sending or receiving signals. For example, the network device may be a user equipment of Machine Type Communication (MTC), a Base Transceiver Station (BTS) in GSM or CDMA, a NodeB in WCDMA, an Evolution Node B (eNB or NodeB) in LTE, a base station device in a 5G network, etc.

The terminal device may be any terminal device. Specifically, the terminal device may communicate with one or more core networks through a radio access network (RAN), and may also be referred to as an access terminal, a User Equipment (UE), a subscriber unit, a subscriber station, a mobile station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an on-board device, a wearable device, a terminal device in a 5G network or the like.

In a Dual Connection (DC) scenario, multiple network nodes (cell groups (CGs)) may serve a terminal device, and transmission of duplicated data may be carried out between the cell groups and the terminal device.

It should be understood that in implementations of the present disclosure, a CG may be equivalent to a network node or a network device, etc.

Figure 1:
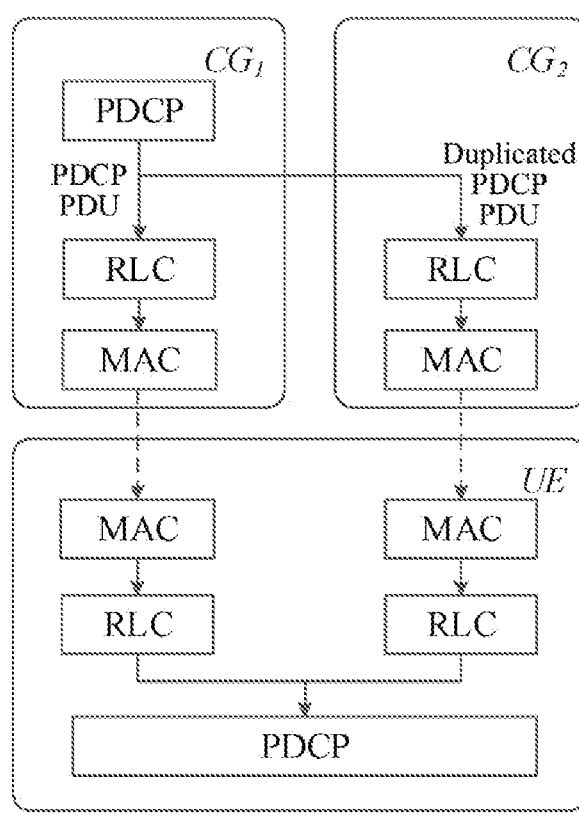
FIG. 1 is a schematic diagram of a protocol architecture of data duplication under dual connection according to an implementation of the present disclosure.
Figure 2:
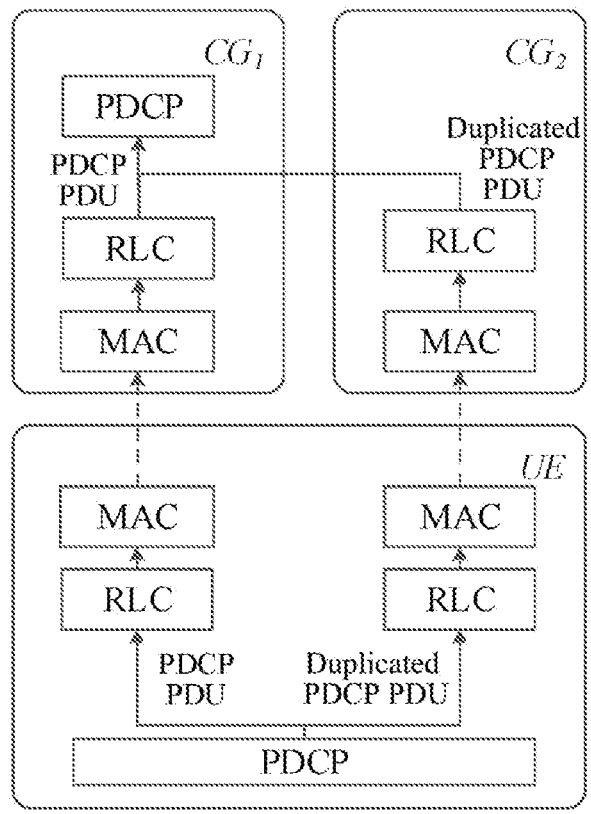
FIG. 2 is a schematic diagram of another protocol architecture of data duplication under dual connection according to an implementation of the present disclosure.

Specifically, in the DC scenario, protocol architectures for a data duplication and transmission mode may be shown in FIG. 1 and FIG. 2.

As shown in FIG. 1 and FIG. 2, the protocol architectures of split bearers are adopted for the data duplication and transmission mode in the DC scenario. For uplink and downlink, a Packet Data Convergence Protocol (PDCP) layer is located in a certain CG (a Master CG (MCG) or a Secondary CG (SCG)), and the CG is an "anchor CG". The PDCP layer duplicates a PDCP Protocol Data Unit (PDU) into two same PDCP PDUs, for example, one is the PDCP PDU and the other is a duplicated PDCP PDU. The two PDCP PDUs pass through Radio Link Control (RLC) layers and Media Access Control (MAC) layers of different CGs, and reach a corresponding MAC layer and RLC layer of a terminal (downlink) or a base station (uplink) through an air interface respectively, and finally are converged at a PDCP layer. When the PDCP layer detects that the two PDCP PDUs are the same duplicated version, discards one of the two PDCP PDUs, and submits the other PDCP PDU to a higher layer.

In addition, in implementations of the present disclosure, two bearers connecting RLC and MAC layers respectively under the PDCP layer are called split bearers, if the PDCP layer is located at an MCG, the split bear is an MCG Split Bearer, and if the PDCP layer is located at an SCG, the split bear is an SCG Split Bearer.

In implementations of the present disclosure, two PDCP PDUs are sent through different CGs, a purpose of frequency diversity gain can be achieved, and thus reliability of data transmission can be improved.

It should be understood that in implementations of the present disclosure, each sublayer sends data to a designated layer at a receiving end according to difference of data of a protocol data unit. Herein, data entering each sublayer and being unprocessed is called a service data unit (SDU), and data in a specific format after processed by the sublayer is called a Protocol Data Unit (PDU). That is, the SDU is an information unit sent from a higher protocol layer to a lower protocol layer, i.e., original data of an SDU is a PDU at an upper protocol layer. In other words, a PDU formed by the present layer is an SDU of a lower layer. For example, each logical channel of each terminal device has an RLC entity, and data received by the RLC entity from a PDCP layer or data sent to the PDCP layer may be referred to as an RLC SDU (or a PDCP PDU). Data received by an RLC entity from a MAC layer or data sent to the MAC layer may be referred to as an RLC PDU (or a MAC SDU). It should also be understood that in implementations of the present disclosure, the RLC layer is located between the PDCP layer and the MAC layer, and the RLC layer may communicate with the PDCP layer through a Service Access Point (SAP) and communicate with the MAC layer through a logical channel. However, implementations of the present disclosure are not limited thereto.

It should be noted that in the prior art, a terminal device may preprocess data. Specifically, the terminal device may send data from a PDCP layer to an RLC layer to generate an RLC PDU before an uplink resource grant reaches the terminal device, and after the uplink resource grant reaches the terminal device, a MAC PDU is generated. Thus, a requirement on instantaneous processing capability of the terminal device can be reduced.

However, if the terminal device is involved in path switching, it may cause too low switching performance. For example, if a PDCP layer of the terminal device initially sends uplink data to an MCG and performs a certain amount of data preprocessing, and the data have been sent from the PDCP layer to an RLC layer of the MCG. Then, when the terminal device is switched to an SCG, the preprocessed data are not "switched", resulting in a decrease in switching performance.

Therefore, a path switching method is provided in an implementation of the present disclosure, which can effectively improve a path switching performance of a terminal device. Below, a path switching method for an uplink scenario will be described according to an implementation of the present disclosure.

Figure 3:
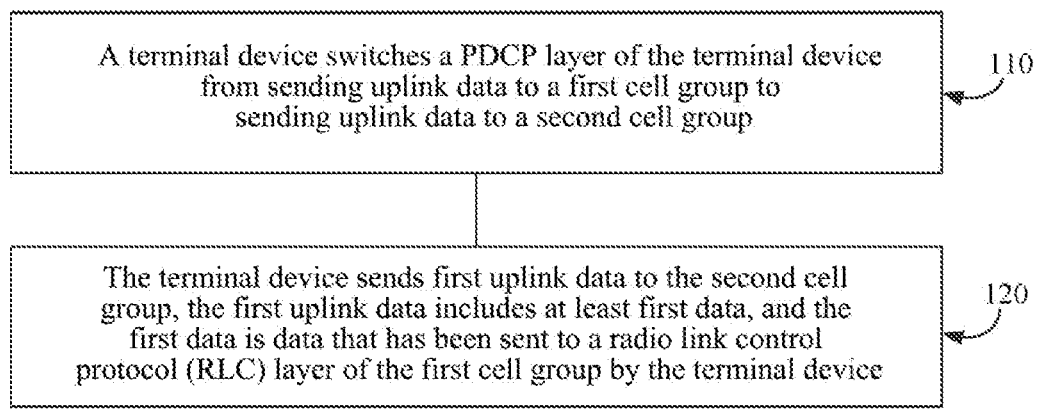
FIG. 3 is a schematic flowchart of a path switching method according to an implementation of the present disclosure.

FIG. 3 is a schematic flow chart of a path switching method for a terminal device according to an implementation of the present disclosure.

As shown in FIG. 3, the method includes acts 110 and 120.

In 110, a terminal device switches a PDCP layer of the terminal device from sending uplink data to a first cell group to sending uplink data to a second cell group.

In 120, the terminal device sends first uplink data to the second cell group, the first uplink data includes at least first data, and the first data are data that have been sent to a radio link control protocol (RLC) layer of the first cell group by the terminal device.

It should be understood that the path switching method according to the implementations of the present disclosure may be applied to a terminal device having multiple transmission paths (e.g., the terminal device supporting dual connection). It should also be understood that terms of the first cell group and second cell group are used in the implementations of the present disclosure, but these cell groups should not be limited to these terms. These terms are only used to distinguish cell groups from each other.

Specifically, the terminal device has a packet data convergence protocol (PDCP) layer that is capable of sending uplink data to the first cell group or the second cell group, the first cell group and the second cell group are different cell groups, and the PDCP layer currently sends uplink data to the first cell group. That is, the PDCP layer of the terminal device currently sends uplink data to the first cell group.

When the terminal device needs to switch a path, the terminal device switches the PDCP layer from sending uplink data to the first cell group to sending uplink data to the second cell group; the terminal device sends first uplink data to the second cell group, the first uplink data at least includes first data, and the first data are data that have already been sent to the RLC layer of the first cell group by the terminal device.

That is, after switching of the PDCP layer of the terminal device from sending uplink data to the first cell group to sending uplink data to the second cell group is completed, by sending, to the second cell group, data that have already been sent to the RLC layer of the first cell group to re-switch the data that have not been "switched", a switching performance can be effectively improved.

It should be understood that the first data in the implementations of the present disclosure includes data that have been sent to the first cell group and needs to be switched to improve the switching performance of the terminal device. That is, an effect of sending the first data to the second cell group is to improve the switching performance of the terminal device. The implementation of the present disclosure does not limit specific contents of the first data.

For example, the first data may include data that have been sent to the RLC layer of the first cell group and for which no correct reception feedback has been received by the terminal device.

For another example, the first data includes data that have been sent to the RLC layer of the first cell group by the terminal device and not completely mapped to a Media Access Control (MAC) PDU.

It should further be understood that the first uplink data in the implementations of the present disclosure may include but is not limited to the first data.

For example, the first uplink data may further include data that have not been sent to the first cell group in a cache of the PDCP layer before the terminal device switches the PDCP layer from sending uplink data to the first cell group to sending uplink data to the second cell group.

For another example, the first uplink data may further include data received by the PDCP layer after the terminal device switches the PDCP layer from sending uplink data to the first cell group to sending uplink data to the second cell group.

Further, since the terminal device will send the first uplink data to the second cell group after completing path switching, the first uplink data includes at least the first data.

Therefore, to further improve a performance of the terminal device, the RLC layer of the first cell group may clear the first data.

For example, the terminal device may send first indication information to the RLC layer of the first cell group before sending the first uplink data to the second cell group, and the first indication information is used for indicating the RLC layer of the first cell group to clear the first data, such that the RLC layer of the first cell group clears the first data after receiving the first indication information.

In addition, in an implementation of the present disclosure, the terminal device switches the PDCP layer from sending uplink data to the first cell group to sending uplink data to the second cell group, which may be configured by a network device or preconfigured. Implementations of the present disclosure are not specifically limited thereto.

For example, as an example, the terminal device may receive second indication information sent by the network device, the second indication information is used for indicating the terminal device to switch the PDCP layer from sending uplink data to the first cell group to sending uplink data to the second cell group; then, the terminal device switches the PDCP layer from sending uplink data to the first cell group to sending uplink data to the second cell group according to the second indication information.

Specifically, the second indication information may be carried in Radio Resource Control (RRC) signaling. That is, the terminal device may determine whether the terminal device switches the PDCP layer from sending uplink data to the first cell group to sending uplink data to the second cell group according to the second indication information in the RRC signaling.

It should be understood that the above-mentioned implementations are merely illustrations of implementations of the present disclosure. Implementations of the present disclosure are intended to improve the switching performance of the terminal device by sending to the second cell group the first data which have been sent to the first cell group and needs to be switched. The implementations of the present disclosure do not specifically limit specific contents of the first data and a mode of path switching.

Figure 4:
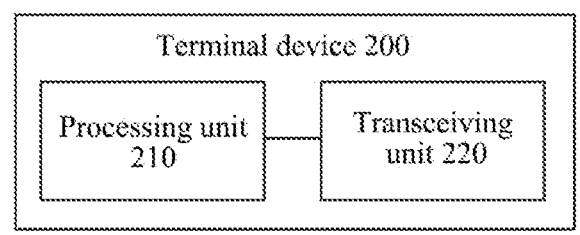
FIG. 4 is a schematic block diagram of a terminal device according to an implementation of the present disclosure.

FIG. 4 is a schematic block diagram of a terminal device 200 according to an implementation of the present disclosure. It should be understood that the terminal device 200 has a packet data convergence protocol (PDCP) layer that is capable of sending uplink data to a first cell group or a second cell group, the first cell group and the second cell group are different cell groups, and the PDCP layer currently sends uplink data to the first cell group.

As shown in FIG. 4, the terminal device 200 includes a processing unit 210 and a transceiving unit 220. The processing unit 210 is configured to switch the PDCP layer from sending uplink data to the first cell group to sending uplink data to the second cell group. The transceiving unit 220 is configured to send first uplink data to the second cell group, wherein the first uplink data includes at least first data, and the first data are data that have been sent to a radio link control protocol (RLC) layer of the first cell group by the terminal device.

Optionally, the first data includes data that have been sent to the RLC layer of the first cell group and for which no correct reception feedback has been received by the terminal device.

Optionally, the first data includes data that have been sent to the RLC layer of the first cell group by the terminal device and not completely mapped to a media access control (MAC) protocol data unit (PDU).

Optionally, the transceiving unit 220 is further configured to send first indication information to the RLC layer of the first cell group before sending the first uplink data to the second cell group, wherein the first indication information is used for indicating the RLC layer of the first cell group to clear the first data.

Optionally, the transceiving unit 220 is further configured to receive second indication information sent by a network device before switching the PDCP layer from sending uplink data to the first cell group to sending uplink data to the second cell group, wherein the second indication information is used for indicating the terminal device to switch the PDCP layer from sending uplink data to the first cell group to sending uplink data to the second cell group. Herein the processing unit 210 is specifically configured to switch the PDCP layer from sending uplink data to the first cell group to sending uplink data to the second cell group according to the second indication information.

Optionally, the first uplink data further includes data that have not been sent to the first cell group in a cache of the PDCP layer before the terminal device switches the PDCP layer from sending uplink data to the first cell group to sending uplink data to the second cell group.

Optionally, the first uplink data further includes data received by the PDCP layer after the terminal device switches the PDCP layer from sending uplink data to the first cell group to sending uplink data to the second cell group.

Figure 5:
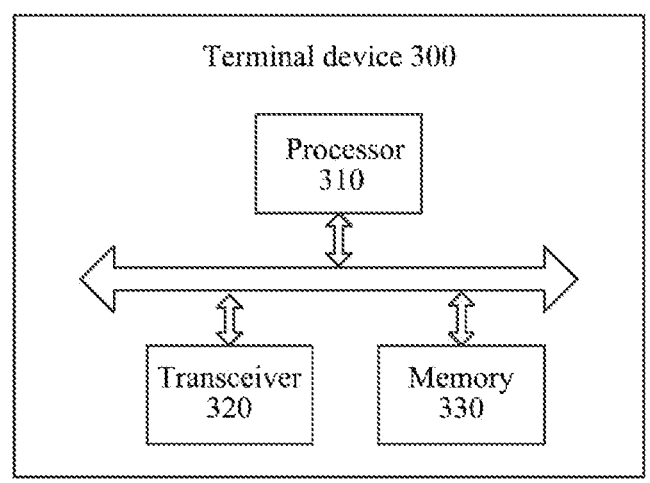
FIG. 5 is a schematic block diagram of another terminal device according to an implementation of the present disclosure.

In an implementation of the present disclosure, the processing unit 210 may be implemented by a processor and the transceiving unit 220 may be implemented by a transceiver. As shown in FIG. 5, a terminal device 300 may include a processor 310, a transceiver 320, and a memory 330. The memory 330 may be used for storing indication information, or may be used for storing codes, instructions, etc., executed by the processor 310. Various components in the terminal device 300 are connected by a bus system. Herein, the bus system includes a power bus, a control bus and a status signal bus in addition to a data bus.

The terminal device 300 shown in FIG. 5 can implement various processes implemented by the terminal device in the method implementation of FIG. 3 described above. To avoid duplication, the details will not be repeated here. That is, method implementations in implementations of the present disclosure may be applied to a processor or implemented by the processor.

In an implementation process, various acts of the method implementations in the implementations of the present disclosure may be completed by an integrated logic circuit of hardware in the processor or an instruction in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads information in the memory and completes the acts of the above method in combination with its hardware.

It should be understood that the processor involved in implementations of the present disclosure may be an integrated circuit chip with a capability for processing signals. The processor can implement or execute the methods, acts or logical diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the memory mentioned in the implementations of the present disclosure may be a volatile memory or non-volatile memory, or may include both volatile and non-volatile memories. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, as used in implementations of the present disclosure and the appended claims, the singular forms "a", "said", "the forgoing" and "the" are intended to include plural referents unless the context clearly dictates otherwise. For another example, depending on context, word "when" as used herein may be interpreted as "if" or "whether" or "while" or "in response to a determination of/that" or "in response to a detection of/that". Similarly, depending on the context, phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that the exemplary units and algorithm acts described in combination with the implementations disclosed herein can be implemented in electronic hardware, or a combination of computer software and electronic hardware. Whether these functions are implemented in hardware or software depends on the specific application and design constraints of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the method implementations and will not be described repeatedly here.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementations, for example, multiple units or components may be combined or integrated into another system, or some features may be ignored or not executed. On the other hand, the mutual coupling or direct coupling or communication connection shown or discussed may be indirect coupling or communication connection of apparatuses or units through some interfaces, and may be in electrical, mechanical or other forms.

The unit described as a separate component may or may not be physically separated, and the component shown as a unit may or may not be a physical unit, i.e., it may be located in one place or may be distributed over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a random access memory, a magnetic disk or an optical disk, etc.

What are described above are merely the specific implementations of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What is claimed is:

1. A path switching method for a terminal device, wherein the terminal device has a packet data convergence protocol (PDCP) layer, the PDCP layer is capable of sending uplink data to a first cell group or a second cell group, the first cell group and the second cell group are different cell groups, and the PDCP layer currently sends uplink data to the first cell group; the method comprising:
   switching, by the terminal device, the PDCP layer from sending uplink data to the first cell group to sending uplink data to the second cell group; and
   sending, by the terminal device, first uplink data to the second cell group, wherein the first uplink data comprises at least first data, and the first data are data that have been sent to a radio link control protocol (RLC) layer of the first cell group by the terminal device;
   and further comprising:
   before switching the PDCP layer from sending uplink data to the first cell group to sending uplink data to the second cell group, receiving, by the terminal device, second indication information sent by a network device, wherein the second indication information is used for indicating the terminal device to switch the PDCP layer from sending uplink data to the first cell group to sending uplink data to the second cell group;
   wherein switching the PDCP layer from sending uplink data to the first cell group to sending uplink data to the second cell group comprises:
   switching the PDCP layer from sending uplink data to the first cell group to sending uplink data to the second cell group according to the second indication information;
   wherein the first data comprises data that have been sent to the RLC layer of the first cell group by the terminal device and not completely mapped to a media access control (MAC) protocol data unit (PDU).

2. The method of claim 1, wherein the first data comprises data that have been sent to the RLC layer of the first cell group and for which no correct reception feedback has been received by the terminal device.

3. The method of claim 1, further comprising:
   before sending the first uplink data to the second cell group, sending, by the PDCP layer of the terminal device, first indication information to the RLC layer of the first cell group, wherein the first indication information is used for indicating the RLC layer of the first cell group to clear the first data.

4. The method of claim 1, wherein the first uplink data further comprises data that have not been sent to the first cell group in a cache of the PDCP layer before switching the PDCP layer from sending uplink data to the first cell group to sending uplink data to the second cell group.

5. The method of claim 1, wherein the first uplink data further comprises data received by the PDCP layer after switching the PDCP layer from sending uplink data to the first cell group to sending uplink data to the second cell group.

6. A terminal device, comprising a processor and a transceiver, wherein the terminal device has a packet data convergence protocol (PDCP) layer, the PDCP layer is capable of sending uplink data to a first cell group or a second cell group, the first cell group and the second cell group are different cell groups, and the PDCP layer currently sends uplink data to the first cell group, wherein the processor is configured to switch the PDCP layer from sending uplink data to the first cell group to sending uplink data to the second cell group; and the transceiver is configured to send first uplink data to the second cell group, wherein the first uplink data comprises at least first data, and the first data are data that have been sent to a radio link control protocol (RLC) layer of the first cell group by the terminal device;

wherein the transceiver is further configured to:

receive second indication information sent by a network device before switching the PDCP layer from sending uplink data to the first cell group to sending uplink data to the second cell group, wherein the second indication information is used for indicating the terminal device to switch the PDCP layer from sending uplink data to the first cell group to sending uplink data to the second cell group;

wherein the processor is specifically configured to switch the PDCP layer from sending uplink data to the first cell group to sending uplink data to the second cell group according to the second indication information;

wherein the first data comprises data that have been sent to the RLC layer of the first cell group by the terminal device and not completely mapped to a media access control (MAC) protocol data unit (PDU).

7. The terminal device of claim 6, wherein the first data comprises data that have been sent to the RLC layer of the first cell group and for which no correct reception feedback has been received by the terminal device.

8. The terminal device of claim 7, wherein the transceiver is further configured to:

send first indication information to the RLC layer of the first cell group before sending the first uplink data to the second cell group, wherein the first indication information is used for indicating the RLC layer of the first cell group to clear the first data.

9. The terminal device of claim 6, wherein the transceiver is further configured to:

send first indication information to the RLC layer of the first cell group before sending the first uplink data to the second cell group, wherein the first indication information is used for indicating the RLC layer of the first cell group to clear the first data.

10. The terminal device of claim 6, wherein the first uplink data further comprises: data that have not been sent to the first cell group in a cache of the PDCP layer before the terminal device switches the PDCP layer from sending uplink data to the first cell group to sending uplink data to the second cell group.

11. The terminal device of claim 6, wherein the first uplink data further comprises data received by the PDCP layer after the terminal device switches the PDCP layer from sending uplink data to the first cell group to sending uplink data to the second cell group.

12. The terminal device of claim 6, wherein the transceiver is further configured to:

send first indication information to the RLC layer of the first cell group before sending the first uplink data to the second cell group, wherein the first indication information is used for indicating the RLC layer of the first cell group to clear the first data.

* * * * *